United States Patent [19]

Campus et al.

[11] Patent Number: 5,141,100
[45] Date of Patent: Aug. 25, 1992

[54] DEVICE TO CONVEY PARTS TO ONE OR MORE PROCESSING STATIONS AND REMOVE THEM

[75] Inventors: Emigliano Campus, Vieux Conde; Pascal Gorisse, Valenciennes, both of France

[73] Assignee: Compagnie Europeenne de Composants Electroniques LCC, Courbevoie, France

[21] Appl. No.: 496,689

[22] Filed: Mar. 21, 1990

[30] Foreign Application Priority Data

Mar. 31, 1989 [FR] France .................. 89 04254

[51] Int. Cl.⁵ .......................................... B65G 35/08
[52] U.S. Cl. ................................. 198/795; 105/141; 104/118; 104/246; 198/832.1
[58] Field of Search ........... 198/795, 838, 845, 832.1, 198/465.1; 105/141; 104/25, 106, 118, 162, 246

[56] References Cited

U.S. PATENT DOCUMENTS

| | | | |
|---|---|---|---|
| 1,236,840 | 8/1917 | Hescock | 198/838 X |
| 1,764,941 | 6/1930 | Edson | 104/246 |
| 1,934,835 | 11/1933 | Weiss | 198/832.1 |
| 2,999,579 | 9/1961 | Kostrzewa | 198/795 |
| 3,616,895 | 11/1971 | LoPresti et al. | 198/832.1 X |
| 3,858,519 | 1/1975 | Masino et al. | 198/795 X |
| 4,044,688 | 8/1977 | Kita | 105/141 X |
| 4,170,122 | 12/1987 | Villanueva | 198/795 X |

FOREIGN PATENT DOCUMENTS

| | | | |
|---|---|---|---|
| 0945817 | 4/1974 | Canada | 104/246 |
| 0097915 | 6/1984 | Japan | 198/795 |
| 0229760 | 9/1989 | Japan | 104/246 |
| 573853 | 3/1976 | Switzerland | |

Primary Examiner—Robert P. Olszewski
Assistant Examiner—James R. Bidwell
Attorney, Agent, or Firm—Oblon, Spivak, McClelland, Maier Neustadt

[57] ABSTRACT

Disclosed is a device to convey parts towards one or more processing stations and to remove them therefrom. This device includes a rail forming a continuous closed circuit and supporting a series of supports which are in contact with the rail by rollers, at least one of which is elastically biased against the rail. Each support is provided, at least at one of its ends, with a ball bearing or roller bearing, by which each support comes into contact with the support that precedes it or follows it. Preferably, the rail has a section with two opposite cants, and it is elastically gripped between rollers having a groove with a shape that matches the cants. Thus, precise positioning is obtained in the transversal direction of each support with respect to the rail, and the ball bearings provide precise contact, with low wear and tear, between two successive supports. This provides for accurate positioning also in the longitudinal direction.

5 Claims, 3 Drawing Sheets

DEVICE TO CONVEY PARTS TO ONE OR MORE PROCESSING STATIONS AND REMOVE THEM

BACKGROUND OF THE INVENTION

1. Field of the Invention

The present invention pertains to a device to convey parts to be processed towards one or more processing stations and to remove them from there.

2. Description of the Prior Art

The problem of conveying parts towards a processing station and removing them is not a new one, and even the term "conveyor-line work" is derived from devices designed to carry out these operations.

The parts are generally conveyed by trolleys or various supports, which follow a closed circuit that passes by a loading station, a processing station and an unloading station. The trolleys or supports may run on the ground or may be borne by continuous rails or taken along by a series of successive means of conveyance.

The development of automatic processing methods, and the need to obtain ever faster working rates and improved precision levels have resulted in changes in many directions. Thus, it has been seen that the most efficient results are obtained when the supporting trolleys are guided with precision at least from the loading station onwards up to and including the unloading station and when they succeed one another, each being supported on the preceding one, with the parts being fixed to the supporting trolleys so as to receive the intended processing without being shifted. As a result, in this manner, the utmost possible limit is placed on the idle time corresponding to the necessary adjustment of the processing tool to each part to be processed.

There is a system available in the market that is geared to these concerns. This system includes a series of supporting trolleys mounted on the links of an endless chain. On that part of the closed circuit comprising the loading, processing and unloading stations, rectilinear rails are provided to ensure the precise positioning, in the directions crosswise to the movement, of the supporting trolleys that run on these rails. Furthermore, the dimensions of the links of the chains and the length of the supporting trolleys are designed so that, in this rectilinear portion of the path, each of the supporting trolleys is in contact with the preceding one.

However, this useful device reaches its limits when the speeds and precision values have to be increased. The cause of this lies chiefly in the many instances of backlash or clearance that result from the use of a chain and which lead to wearing out and lack of precision in the relative longitudinal position of the supporting trolleys. Furthermore, the friction inherent in the system calls for powerful driving means which consequently have an appreciable degree of inertia that is troublesome when it is desired to have fast work-rates with non-continuous motions.

SUMMARY OF THE INVENTION

The present invention is aimed at overcoming these drawbacks. It consequently provides a device for conveying parts to be processed towards one or more processing stations and to remove them therefrom, said device comprising:

a series of supports each designed to support at least one part;

movement means designed to move the supports along a closed path including a loading station, where the parts to be processed are laid down or fixed on the supports, one or more processing stations, where the parts are taken to a position defined beforehand and are processed, and a removal station where the processed parts are separated from the supports, these movement means including at least one rail along which the supports move to the loading station, the processing station or stations and the unloading station, each of them being supported on the preceding support, wherein:

each support is provided, at least at one of its ends, with a ball bearing by which it comes into contact with the support that precedes it or follows it;

each support is in contact with the rail all along said closed path; and contact of the support with the rail is obtained by means of rollers, at least one of which is pressed against the rail by an elastic means.

Preferably, the rail has a section with two opposite cants, and at least two rollers, having a groove with a shape that matches said cants, the rollers each working together with one opposite cant, one of the rollers being borne by a movable element, which is stressed by a spring and pushes said roller against the rail to provide for precise positioning of the trolley in the crosswise direction.

These modes enable precise positioning of each trolley, both in the direction crosswise to the motion and, in the longitudinal direction, with respect to the trolley that precedes or follows it. The rollers and the ball bearings are precise objects with low wear and tear. They are easily replaced and yet they cost little.

According to the modes preferred:

the means for moving the supports include a jack which makes the supports move forward, at least between the loading station and the first processing station;

each trolley is provided with means to identify its position in the direction of the movement;

These modes provide for fast rates of passage of a support from the loading station to the processing station or of the movement of the support in a processing station while, at the same time, preserving the necessary precision. Advantageously, the device is provided with means enabling the fast removal or positioning of a support by the moving of at least one roller away from the rail.

Idle periods due to accidents causing damage to a support are thus reduced to a minimum. If the motion of the supports is driven by means of a jack, as stated further above, the absence of a trolley may be compensated for by increasing the travel of the jack by a corresponding length.

BRIEF DESCRIPTION OF THE DRAWINGS

The invention shall now be described in greater detail by means of a practical example, illustrated by means of the appended drawings, wherein:

FIG. 4 shows a cross-sectional view taken along line IV—IV of FIG. 3.

DESCRIPTION OF THE PREFERRED EMBODIMENT

Figure 1:
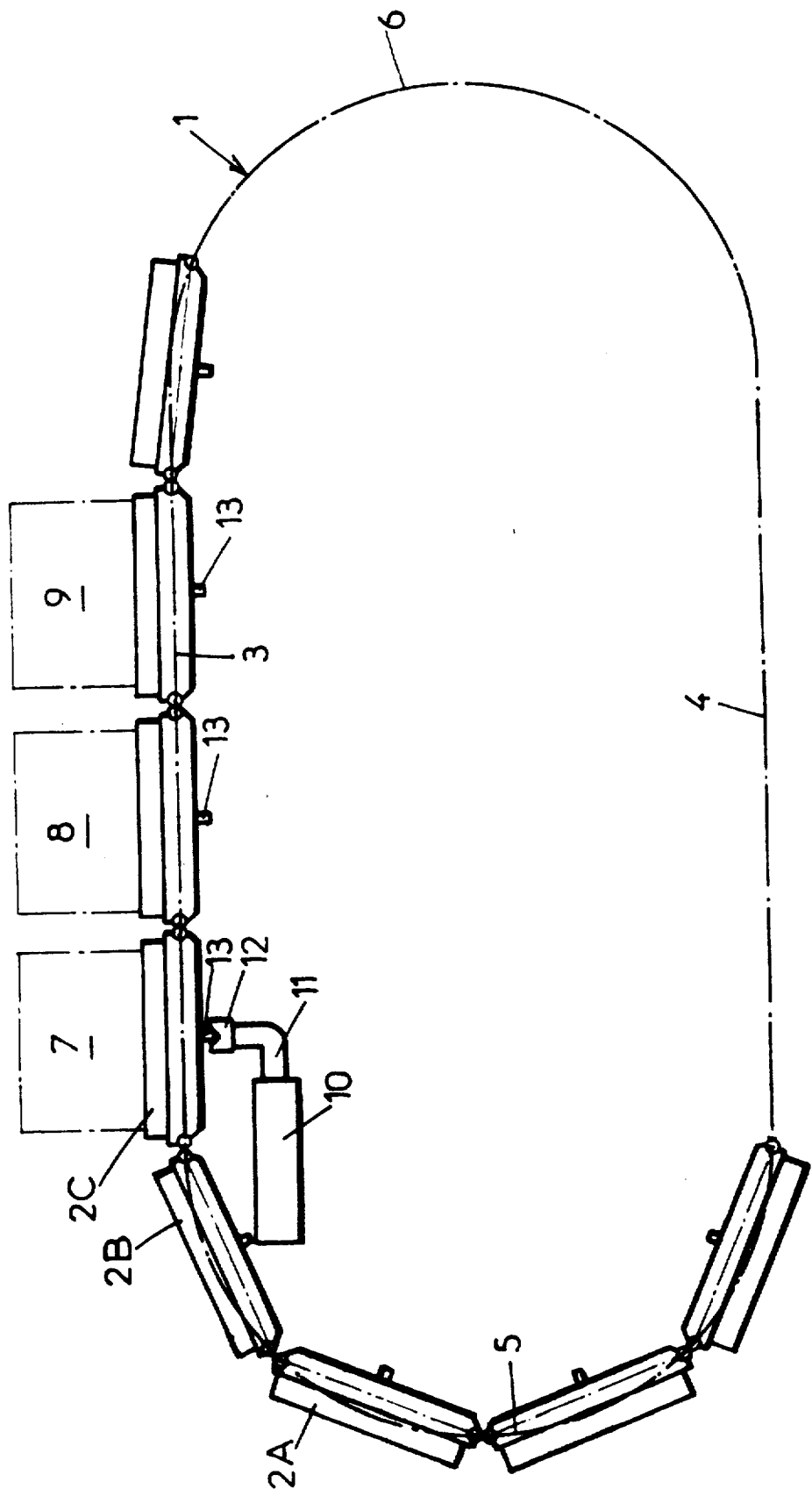
FIG. 1 is a general, schematic view in elevation of a parts-conveying device forming part of a conveyor line for the checking of electronic components.

A rail 1 defines the closed-circuit path of a certain number of supporting trolleys 2A, 2B, 2C etc. The rail 1 has two horizontal, rectilinear parts 3, 4, located one on top of the other, and joined by two semi-circular parts 5 and 6. It will be noted that, without going beyond the scope of the invention, the line of the path taken by the rail 1 may be different, for example it may be in a horizontal plane instead of a vertical plane. It may also take a different shape, for example a non-planar shape. The upper part 3 of the path of the rail 1 goes through a loading station 7, a processing station 8 and an unloading station 9. The movement of the supporting trolleys between these stations is provided by means of a jack 10, the rod 11 of which bears a driving part 12 that works together with an identifying and actuating pawl 13 provided on each supporting trolley. Means, not shown, enable the part 12 to retire when the jack, after having moved a supporting trolley, returns to its initial position.

In the example shown, the total length of the rail 1 is equal to or very slightly greater than the added-up length of the trolleys 2a, 2b etc. which it carries. It can be seen that each actuation of the jack makes all the supporting trolleys go forward simultaneously, each trolley pushing the one before it. It is also possible to provide for an additional actuating means, by conveyor line or otherwise, to take the supporting trolleys to a position such that they will be taken up again by the jack 10.

Figure 2:
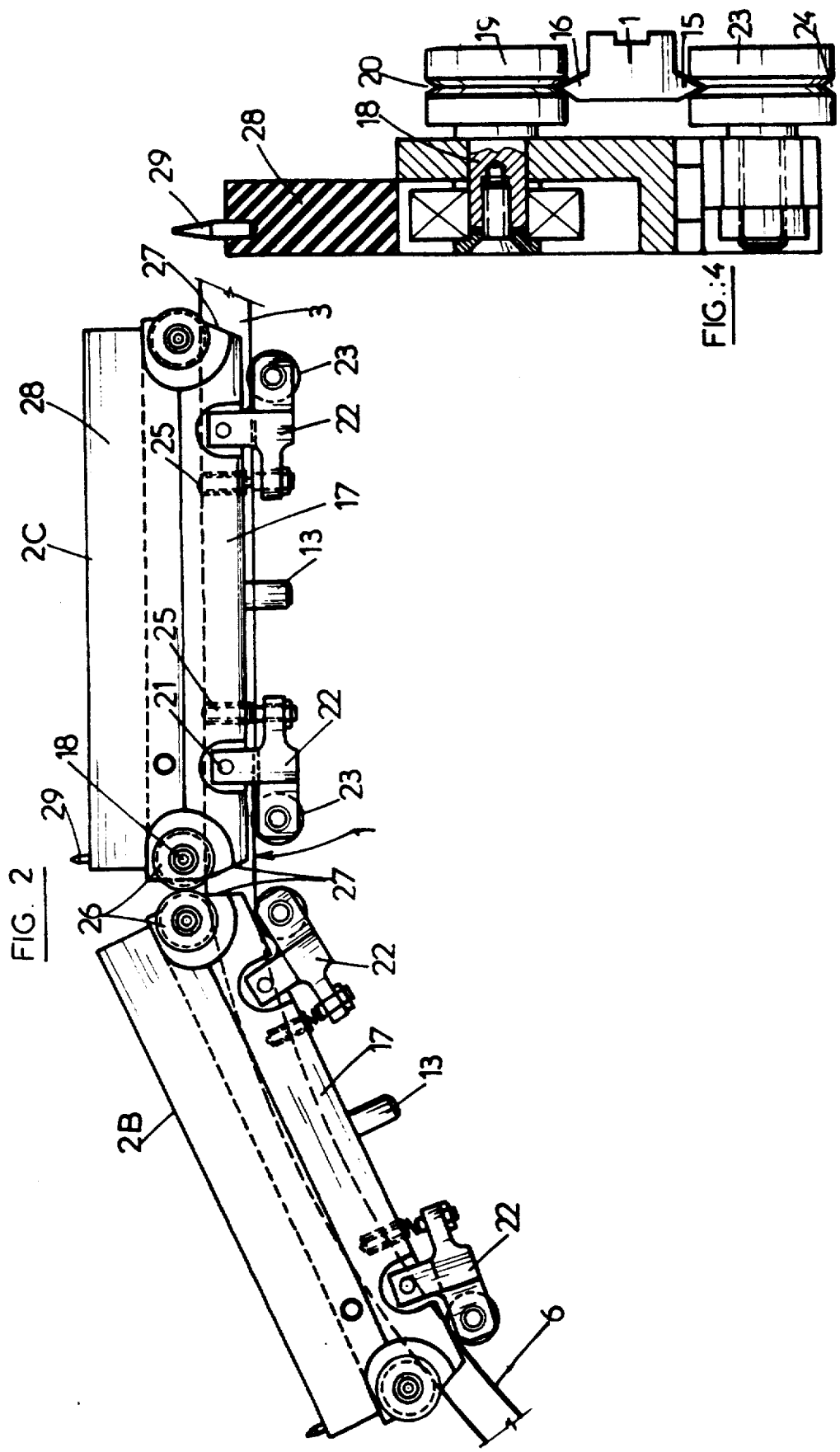
FIG. 2 corresponds to an enlargement of a part of FIG. 1.
Figure 3:
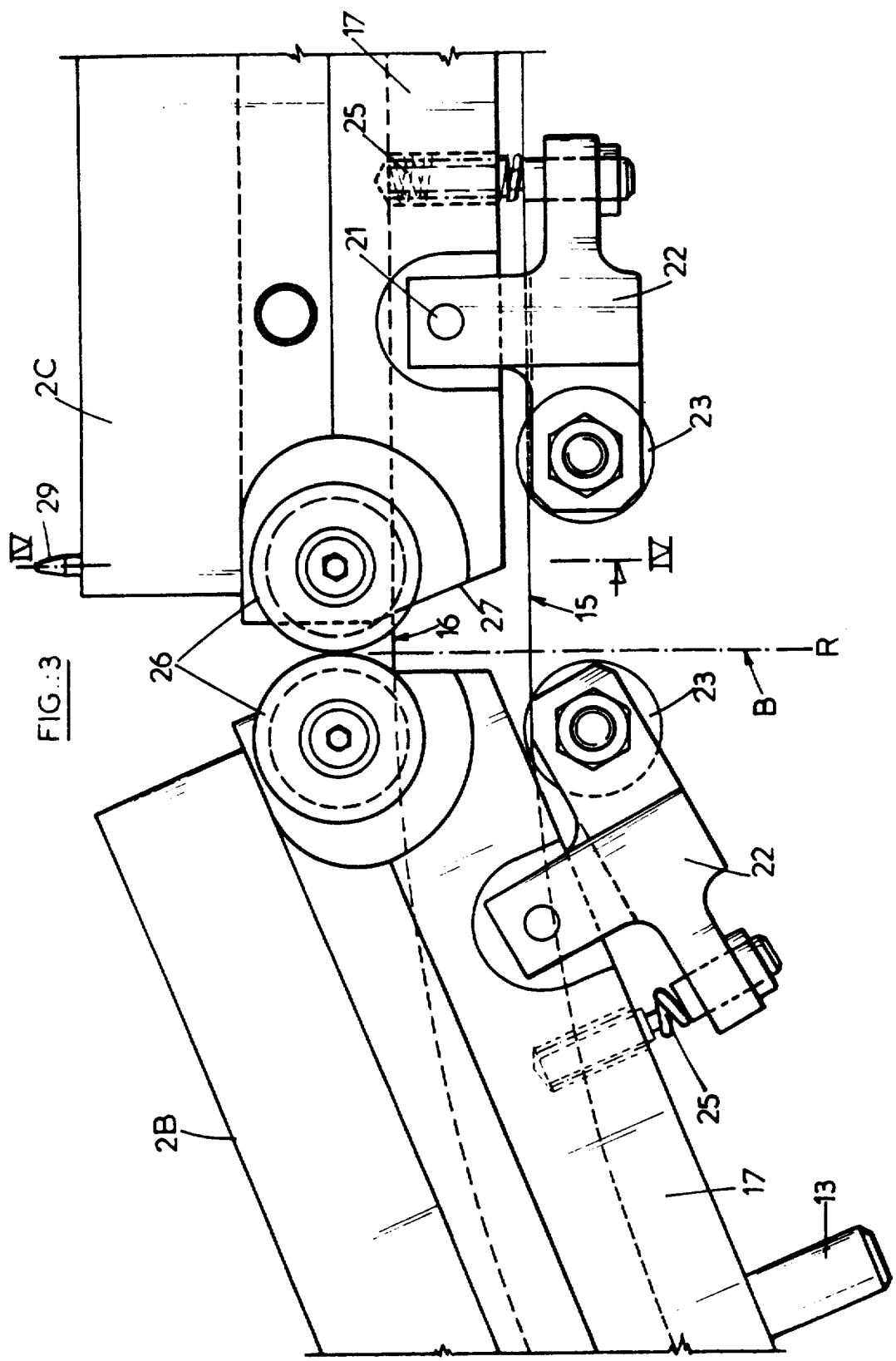
FIG. 3 corresponds to a further enlargement of a part of FIG. 2.

FIGS. 2 and 3 show the relative position of two trolleys 2B, 2C, the first one being located on a part 6 of the rail 1 in the form of an arc of a circle, while the other trolley is located on the rectilinear part of the rail 3 which follows it. The rail 1 has a section including two opposite parts forming cants or sharp edges, one part 15 at the bottom and the other part 16 towards the top (see FIG. 4). Each supporting trolley has a metal frame 17 on which there is mounted, at each of its longitudinal ends, a transversal shaft 18 which bears a roller 19. This roller 19 has a groove 20, with a V-shaped section, the angle of which matches the angle of the cant 16 of the section of the rail 1 for cooperative engagement. Furthermore, by means of another transversal shaft 21, the frame 17 bears a movable element 22 on which there is mounted a second roller 23, with a shape identical to the shape of the roller 19 and with its V-shaped groove 24 working together with the lower cant 15 of the section of the rail 1. A spring 25 is supported, firstly, on the frame 17 and, secondly, on the movable element 22 and acts so as to push the roller 23 towards the rail 1, so much so that this rail 1 is gripped between the two rollers 19 and 23.

A ball bearing 26 is mounted with its inner ring fixed on the shaft 18, on the side opposite the roller 19 with respect to the frame 17.

As can be seen clearly in FIGS. 2 and 3, the shape of the frame 17 is such that two consecutive supporting trolleys 2B and 2C are in contact with each other by the external ring of their ball bearing 26. Also, as shown in FIG. 2, roller 19 and bearing 26 are external of rail 1 and the closed path of the rail while roller 23 is internal of rail 1 and the closed path. To prevent the frames 17 of two consecutive supporting trolleys from coming into contact, in a curved part of the rail, the end of the frame 17 has an oblique part 27. Furthermore, the shape and position of the movable element 22 are designed so that the roller 23 is in a withdrawn position with respect to the ball bearing 26 when the trolley is on a rectilinear part of the rail 1. To be precise, it may be indicated that the oblique part 27 of the frame and a plane tangential to the roller 23 do not reach the radius of curvature R of the curved part of the rail.

However, it is advantageous for the movable roller 23 to be at a short distance from the fixed roller 19. We thus reduce the amplitude of the movement of the movable element when the supporting trolley goes from a rectilinear part of the path to a curved part of this part, and this reduces wear and tear.

Besides, as a result of the fact that the ball bearing 26 is coaxial with the wheel 19, the forces transmitted from one supporting trolley to another, for their movements for example, do not cause any reaction on the contact of the roller 19 with the rail 1. This feature ensures a long life to both these elements and, hence, ensures long-lasting precision.

In the example shown, the lower part of the frame 17 is made of steel, to procure maximum rigidity, and the upper part 28 is an electrically insulating material as the device is designed for electrical controls.

A precise indexing pawl is shown at 29. This pawl 29 is placed at the upper part of the frame and is designed to enable the very precise positioning of the parts to be processed with respect to the frame, as well as exact relative positioning of the frame with respect to the loading means and, above all, the processing means.

If it is desired to remove a supporting trolley from the device, it is enough to move the movable element 22 against the force of the spring 25, until moving away of the rollers 19 and 23 makes it possible to bring the ends 15 and 16 of the rail section 1 out of the grooves 20 and 24 of the rollers. The trolleys are put back in place in the same manner.

As can be seen, precise positioning is obtained in the crosswise direction of the supporting trolleys with respect to the rail owing to the conjugated shapes of this rail and of the rollers 19-23 as well as a precise positioning in the longitudinal direction of two supporting trolleys with respect to each other, owing to the small clearance of the ball bearings 26, which provides for direct contact, without wear and tear, between the trolleys.

Obviously, numerous modifications and variations of the present invention are possible in light of the above teachings. It is therefore to be understood that within the scope of the appended claims, the invention may be practiced otherwise than as specifically described herein.

What is claimed is:

1. A device to convey parts to be processed towards one or more processing stations and to remove them therefrom, which comprises:

a series of supports each designed to support at least one part;

means for moving the supports along a closed path including a loading station, at least one processing station, and an unloading station, said means for moving the supports including at least one rail along which the supports move between the loading station, the at least one processing station and the unloading station, wherein each support comprises, at at least one end thereof, a bearing by which each said support contacts an adjacent support, each support being in continuous contact with the at least one rail all along said closed path; at least two rollers for maintaining contact of each support with the at least one rail, a first roller of said rollers being positioned on one side of the at least one rail and a second roller of said rollers being positioned on an opposite side of the at least one rail, and elastic means for biasing said second roller against the at least one rail and wherein the bearing and said first rollers are coaxial and said first roller is positioned so as to provide for contact of the support with the at least one rail.

2. A device according to claim 1, wherein the second roller is borne by a movable element, and said second roller is stressed by said elastic means against the at least one rail for positioning of the trolley in a crosswise direction.

3. A device according to claim 1, wherein the means for moving the supports comprises a jack which includes means for moving the supports forward, at least between the loading station and the at least one processing station.

4. A device according to claim 1, wherein each support comprises means for identifying the position of each said support in a direction of movement of each said support.

5. A device according to claim 1, which comprises means for enabling removal and positioning of a support by movement of at least one roller away from the at least one rail.

* * * * *